(12) United States Patent
Beri et al.

(10) Patent No.: US 11,769,281 B2
(45) Date of Patent: Sep. 26, 2023

(54) VECTOR OBJECT TRANSFORMATION

(71) Applicant: Adobe Inc., San Jose, CA (US)

(72) Inventors: Tarun Beri, Noida (IN); Matthew David Fisher, Burlingame, CA (US)

(73) Assignee: Adobe Inc., San Jose, CA (US)

( * ) Notice: Subject to any disclaimer, the term of this patent is extended or adjusted under 35 U.S.C. 154(b) by 31 days.

(21) Appl. No.: 17/590,255

(22) Filed: Feb. 1, 2022

(65) Prior Publication Data

US 2023/0245356 A1 Aug. 3, 2023

(51) Int. Cl.
*G06T 11/20* (2006.01)
*G06F 3/04847* (2022.01)

(52) U.S. Cl.
CPC ........ *G06T 11/203* (2013.01); *G06F 3/04847* (2013.01)

(58) Field of Classification Search
CPC ............................ G06T 11/203; G06F 3/04847
See application file for complete search history.

(56) References Cited

U.S. PATENT DOCUMENTS

| | | | | |
|---|---|---|---|---|
| 5,325,475 A | * | 6/1994 | Poggio | G06V 10/757 |
| | | | | 345/475 |
| 5,854,634 A | * | 12/1998 | Kroitor | G06T 13/00 |
| | | | | 345/473 |
| 6,111,588 A | * | 8/2000 | Newell | G06T 11/20 |
| | | | | 345/441 |
| 6,911,980 B1 | * | 6/2005 | Newell | G06T 17/30 |
| | | | | 345/647 |
| 2014/0085311 A1 | * | 3/2014 | Gay | G06F 3/04883 |
| | | | | 345/467 |

OTHER PUBLICATIONS

H. S. M. Al-Khaffaf, A. Z. Talib, W. M. N. W. Zainon and M. A. Osman, "A framework for objective performance evaluation for digital font reconstruction," 2016 SAI Computing Conference (SAI), London, UK, 2016, pp. 369-372, doi: 10.1109/SAI.2016.7556008 (Year: 2016).*
"DALL.E 2", OpenAI [retrieved Oct. 19, 2022]. Retrieved from the Internet <https://openai.com/dall-e-2/>., Jan. 5, 2021, 13 Pages.

(Continued)

*Primary Examiner* — William A Beutel
(74) *Attorney, Agent, or Firm* — FIG. 1 Patents

(57) ABSTRACT

Vector object transformation techniques are described that support generation of a transformed vector object based on a first vector object and a second vector object. A plurality of paths for a first and second vector object, for instance, are generated. Corresponding paths are determined by detecting which of the plurality of paths from the first vector object correspond to which of the plurality of paths from the second vector object. A mapping of control points between the first and second vector objects is generated. Using the mapping, a transformation of the first vector object is generated by adjusting one or more control points of the first vector object. As a result, the transformed vector object includes visual characteristics based on both the first vector object and the second vector object.

20 Claims, 13 Drawing Sheets

(56) References Cited

OTHER PUBLICATIONS

Adobe Creative Cloud, "Transform Artwork Freely in Illustrator Using Puppet Warp | Adobe Creative Cloud", YouTube Video uploaded by Adobe Creative Cloud [online][retrieved Aug. 26, 2022]. Retrieved from the Internet <https://www.youtube.com/watch?v=eAsqRJA9nOE>., Aug. 14, 2018, 4 Pages.

Autodesk, "Morph deformer", Autodesk Inc. [retrieved Aug. 26, 2022]. Retrieved from the Internet <https://knowledge.autodesk.com/support/maya/learn-explore/caas/CloudHelp/cloudhelp/2022/ENU/Maya-CharacterAnimation/files/GUID-EFDD514A-10FF-44A2-BC93-0F53DB5ABA19-htm.html>., Dec. 6, 2021, 6 Pages.

Beri, Tarun, et al., "US Application as Filed", U.S. Appl. No. 17/590,255, filed Feb. 1, 2022, 65 pages.

CG Shortcuts, "Object Morphing—Cinema 4D Tutorial (Free Project)", YouTube Video uploaded by CG Shortcuts [online][retrieved Aug. 26, 2022]. Retrieved from the Internet <https://www.youtube.com/watch?v=ZYoCydK5-WM>., Jan. 7, 2022, 4 Pages.

Kuhn, Harold W, "The Hungarian method for the assignment problem", Naval Research Logistics Quarterly, vol. 2, No. 1-2 [retrieved Aug. 26, 2022]. Retrieved from the internet <https://web.archive.org/web/20140211034126id_/http://tom.host.cs.st-andrews.ac.uk:80/CS3052-CC/Practicals/Kuhn.pdf>., Mar. 1955, 19 Pages.

Müller, Meinard, "Dynamic time warping", In: Information Retrieval for Music and Motion. Springer, Berlin, Heidelberg [retrieved Aug. 26, 2022]. Retrieved from the Internet <https://www.researchgate.net/publication/285279006_Dynamic_time_warping>., Jan. 2007, 17 Pages.

Ramesh, Aditya, et al., "Hierarchical Text-Conditional Image Generation with Clip Latents", Cornell University arXiv, arXiv.org [retrieved Oct. 19, 2022]. Retrieved from the Internet <https://arxiv.org/pdf/2204.06125.pdf>., Apr. 13, 2022, 27 Pages.

Ross, Amy, "Procrustes analysis", Department of Computer Science and Engineering University of South Carolina [retrieved Aug. 26, 2022]. Retrieved from the Internet <https://citeseerx.ist.psu.edu/viewdoc/download?doi=10.1.1.119.2686&rep=rep1&type=pdf>., 8 Pages.

Stormz, "Morph Objects into Other Objects in Houdini", YouTube Video uploaded by Stormz [online][retrieved Aug. 26, 2022]. Retrieved from the Internet <https://www.youtube.com/watch?v=8LsI2ARFv04>, Nov. 10, 2020, 4 Pages.

Liu, Ying-Tian, et al., "Learning Implicit Glyph Shape Representation", arXiv [retrieved Nov. 16, 2021]. Retrieved from the internet <https://arxiv.org/pdf/2106.08573.pdf>., Jun. 2021, 9 Pages.

Smirnov, Dmitriy, et al., "Deep Parametric Shape Predictions using Distance Fields", arXiv Preprint, Cornell University, arXiv.org [retrieved Nov. 16, 201]. Retrieved from the Internet <https://arxiv.org/pdf/1904.08921.pdf>., Mar. 19, 2020, 14 pages.

Wang, Yizhi, et al., "Attribute2Font: creating fonts you want from attributes", ACM Transactions on Graphics, vol. 39, No. 4 [retrieved Nov. 16, 2021] Retrieved from the Internet <https://www.researchgate.net/publication/341423467_Attribute2Font_Creating_Fonts_You_Want_From_Attributes>., Jun. 2020, 15 Pages.

Xi, Yankun, et al., "JointFontGAN: Joint Geometry-Content GAN for Font Generation via Few-Shot Learning", MM 20: Proceedings of the 28th ACM International Conference on Multimedia [retrieved Nov. 16, 2021]. Retrieved from the Internet <https://par.nsf.gov/servlets/purl/10199594>., Oct. 12, 2020, 9 Pages.

\* cited by examiner

VECTOR OBJECT TRANSFORMATION

BACKGROUND

Vector objects are used to create a wide range of digital content due to the flexibility and accuracy in portraying the objects when rendered for display by a display device. Vector objects are mathematically generated using paths that include a number of control points such as anchors and handles, rather than as a collection of pixels. This enables vector objects to be scaled and modified by a computing device without a loss in visual quality. As such, vector objects are employed for a variety of purposes, a notable example of which includes vector glyphs of a font to represent letters, numbers, and other symbols of the font.

Fonts are usable to simultaneously express a message based on the message of the text as well as convey a theme or a style based on a visual appearance of the text. However, fonts are typically rigid and discrete, and creation of new fonts "from scratch" is challenging and time consuming Consequently, a digital artist is often limited to selection of predefined fonts. Accordingly, it is desirable for the digital artist to have the ability to create custom fonts by modifying visual features of existing fonts.

Conventional techniques limit modifications of vector fonts to pre-defined axes, for instance changing the size of a glyph. Modification of features not included in pre-defined axes is not possible using such conventional techniques. Thus, a digital artist is forced to search for a font that is a "closest approximation" of their intent. Other conventional approaches rely on machine learning to modify fonts based on arbitrary axes, for instance "sad" or "happy." However, conventional machine learning approaches do not consider visual aspects of more than one vector object and are limited to the extent of the model's understanding of the arbitrary axes. For instance, what "sad" or "happy" means with respect to a font. Further, such conventional techniques are limited to rasterized input and produce raster output. Consequently, the glyphs output by these conventional techniques are susceptible to limitations of rasterization and are creatively constrained.

SUMMARY

Vector object transformation techniques are described that support generation of a transformed vector object based on a first vector object and a second vector object. A plurality of paths for a first and second vector object, for instance, are generated. Corresponding paths are determined by detecting which of the plurality of paths from the first vector object correspond to which of the plurality of paths from the second vector object. A mapping of control points between the first and second vector objects is generated. Using the mapping, a transformation of the first vector object is generated by adjusting one or more control points of the first vector object. As a result, the transformed vector object includes visual characteristics based on both the first vector object and the second vector object, and as such overcomes conventional techniques that are limited to modifications on limited or arbitrary axes, or only produce rasterized output.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
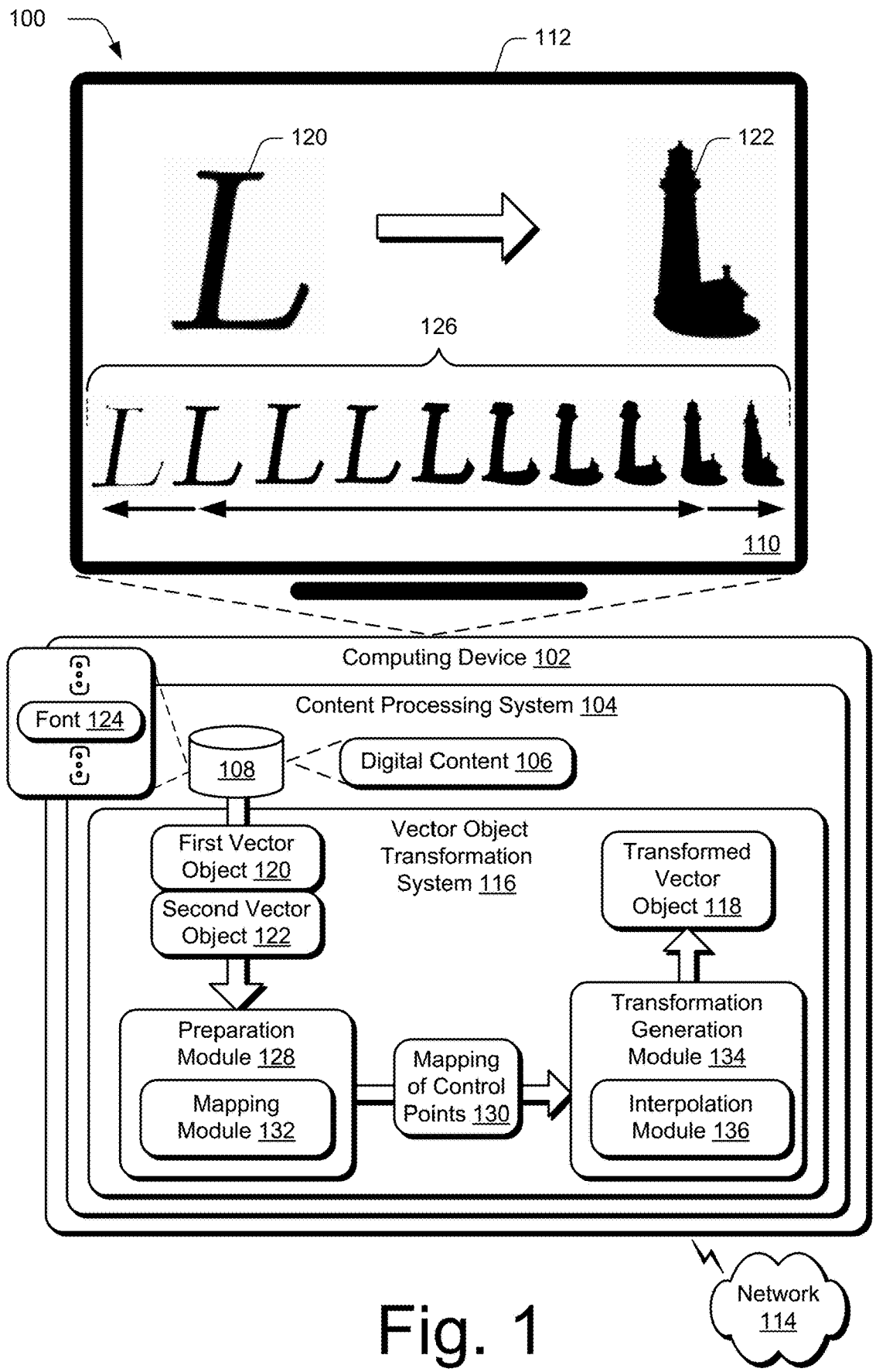
FIG. 1 is an illustration of an environment in an example implementation that is operable to employ vector object transformation techniques described herein.

Content processing systems are often tasked with imparting a unique style and customizations to objects included as part of the digital content. However, conventional techniques employed by these systems to support customizations of vector objects, in particular with respect to vector fonts, are limited and challenging. Vector objects are defined mathematically (e.g., as a collection of Bezier curves) to include paths that are rendered for output, e.g., for display in a user interface, onto a physical medium, and so forth. Vector paths are defined by start and end points as well as a number of control points such as anchors and handles, and as such are independent of resolution.

Conventional techniques used to edit the visual appearance of vector objects such as vector fonts are limited to making changes along pre-defined axes of a single vector object (e.g., size). Further, conventional techniques to modify a font on an arbitrary axis such as those using machine learning are limited to rasterized output based on a model's understanding of the arbitrary axis. As such, these conventional techniques forgo the advantages made possible by vector objects involving resizing and crispness of display, and do not consider visual features of more than one vector object. This limits accuracy of display of the objects as well as inefficient consumption of hardware and software resources of computing devices used to implement these conventional techniques.

Accordingly, vector object transformation techniques are described that enable a content processing system to overcome these challenges and limitations to generate customized vector objects by generating a transformation of a vector object based on visual characteristics of a source vector object and one or more target vector objects. Vector objects are utilized in a variety of different scenarios, examples of which include stock images, as vector glyphs of a font, objects in a user interface or webpage, and so forth. The techniques described herein are particularly useful where the source vector object and target vector object share visual properties, such as in a font example where vector objects are a corresponding glyph represented in two or more different fonts. In an example, this includes generating a "continuum" of vector fonts between and beyond two or more input fonts.

Continuing with the font example, a vector object transformation system receives a first vector object (i.e., a source vector object) as input, e.g., selected via a user input received via a user interface. In the font example, the first vector object is a text object containing one or more glyphs in a source vector font. In one embodiment, the vector object transformation system also receives a second vector object (i.e., a target vector object) as input, such as the same text in a target vector font, e.g., by receiving a user input specifying the target vector font.

In another embodiment, a recommendation module is operable to generate a recommendation for the second vector object based on characteristics of the first vector object. In an example, this includes automatically generating a list of fonts which have visual properties similar to the source vector font. The similarity between visual features is determined using a scoring metric based on the visual characteristics of fonts. In another example, the similarity is determined based on a cost analysis to generate a transformation, e.g., to minimize a cost associated regarding visual differences between the fonts.

Regardless of the origin of the second vector object, a preparation module of the vector object transformation system is configured to receive the first vector object and second vector object, e.g., a text object of a source vector font and of a target vector font. In the font example, where the text object contains more than one glyph, each glyph is processed one-by-one. Further, individual paths from each glyph are also processed one-by-one and later reassembled as described below.

A path generation module is employed to separate constituent paths that are used to form the vector objects. The path generation module, for instance, identifies the paths used to form individual portions of a glyph of a letter "L" and identifies paths used to form individual portions of a lighthouse, e.g., a tower, house, and so on. In this way, the paths are "separated out" from respective vector objects that are used to define corresponding portions of the objects.

The paths are received as input by a correspondence detection module, which is configured to generate path pairs by determining which paths from the first vector object (i.e., source paths) correspond to which paths from the second vector object (i.e., target paths). Because the first and second vector objects have differing visual characteristics, the paths of the vector objects have differing counts, densities, and/or relative locations of control points, e.g., anchor points and handles. Continuing the example above, the letter "L" has a different number, density, and relative location of control points than the control points used to define individual portions of the lighthouse.

Therefore, in order to generate a transformed vector object, a correspondence between the control points of each path of the path pair is first generated as a mapping of control points. In one example, the mapping of control points is generated to equalize a number of control points in each path of the path pair and match the relative locations of the control points. In other words, the mapping produces an in-order bipartite matching between the control points of the source path of the first vector object and the control points of the corresponding target path of the second vector object.

A variety of techniques are usable to find an in-order bipartite match. In one example, a dynamic time warping module is employed to perform dynamic time warping (DTW). DTW provides a mechanism to compare two temporal series of possibly unequal lengths and finds an optimal mapping of each of the sampled points between terminal points (i.e., start and end points) of the series. In this example, DTW is employed to find an initial correspondence between control points of each path of the path pairs.

To perform DTW, the path pair (e.g., target path and source path) is first converted to two series of data suitable for DTW by converting each path of the path pair to a series of uniformly separated points. Additionally, the terminal points of the two series are pre-matched and assumed to correspond. Selection of the terminal points is optimized to ensure near uniform separation, which serves to minimize artifacts in the transformed vector object. With the determined start and end points, the dynamic time warping module is operable to use DTW to determine an initial match of control points (e.g., anchor points) between the paths of the path pair. Each available control point mapping is extracted from the results of DTW, and additional mappings are further computed in a variety of ways as described below.

For instance, a cost determination module is configured to compute additional matches of control points using a cost graph to extract refined point matches indicative of control point matches. The cost graph measures a cost of mapping a control point of the source path to any of the unmapped control points in the target path. The cost graph is based on both the proximity of a mapped sample point in the target path to a control point in the target path, as well as angle equivalence between source and target control points. For instance, the difference between angles subtended at a source control point and at target control point.

By taking into consideration the angles, curvature changes in both the source path and the target path are tracked with increased accuracy and result in increased precision in control point mappings. Considering angles also provides an added level of validation, for instance, in resolving mappings produced by DTW where the mapped anchor points are spatially close to one another. Accordingly, use of the cost graph built on relative offset of control points as well as angle equivalence between source and target control points increases mapping accuracy of control points between the two paths.

Once the control points from the source path and target path are logically mapped using the cost graph, the next step in this example before a transformation is generated is to ensure that the source path and target path have the same number of control points. For instance, in some examples the number of control points from the source path does not match the number of control points in the target path. Accordingly, a control point balancing module is employed to balance the remaining unmatched control points, e.g., anchor points and handles.

Although anchor points may be inserted uniformly to the deficient path (e.g., the path of the path pair with fewer anchors) this leads to uneven spacing, which results in visual artifacts in the transformed vector object. Therefore, the control point balancing module in this example utilizes proportional insertions to balance the number of anchors such that consecutive anchor points are evenly placed in both the paths. Further, a handle insertion module is configured to insert handles to anchors that are missing handles. Accordingly, after balancing the remaining unmatched control points, the source and target path have an accurate and balanced (i.e., one-to-one) mapping of control points.

The mapping of control points is received by a transformation generation module, which is operable to generate the transformed vector object, e.g., as a transformation of the first vector object. In an example where the first vector object and second vector object include more than one path, the paths are transformed one by one, and reassembled to form a transformed vector object. Transformations are generated by adjusting at least one control point of the first vector object, e.g., based on properties of the corresponding control point of the second vector object.

In an example, generating the transformation includes linearly interpolating properties of the control points including their locations, roundedness attributes, smoothness attributes, etc. In a font example, uniform movement of the mapped control points in a text object of a source vector font produces a new vector state of the path, and thus a text object in a custom font. In this way, a continuum of fonts between a source vector font and a target vector font is able to be generated.

In some embodiments, the transformation is based on a relative amount of influence of the second vector object on the first vector object. For instance, the control points of the first vector object are adjusted to an extent determined by the specified relative amount. In this way, the resulting transformed vector object can be customized to "look like" the first vector object or the second vector object to a specified degree.

It is also possible to extrapolate properties associated with a control point of the first vector object away from or beyond properties associated with the corresponding control point of the second vector object. Higher levels of interpolation and extrapolation are also considered, for instance generating a transformation based on a third vector object, fourth vector object, etc. Accordingly, the techniques described herein overcome the limitations of conventional techniques by enabling creative customization of vector objects based on visual characteristics of multiple vector objects, while maintaining functionality of a mathematical representation associated with vector output.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ vector object transformation techniques described herein. The illustrated environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone), and so forth. Thus, the computing device 102 ranges from full resource devices with substantial memory and processor resources (e.g., personal computers, game consoles) to a low-resource device with limited memory and/or processing resources (e.g., mobile devices). Additionally, although a single computing device 102 is shown, the computing device 102 is also representative of a plurality of different devices, such as multiple servers utilized by a business to perform operations "over the cloud" as described in FIG. 12.

The computing device 102 is illustrated as including a content processing system 104. The content processing system 104 is implemented at least partially in hardware of the computing device 102 to process and transform digital content 106, which is illustrated as maintained in a storage device 108 of the computing device 102. Such processing includes creation of the digital content 106, modification of the digital content 106, and rendering of the digital content 106 in a user interface 110 for output, e.g., by a display device 112. Although illustrated as implemented locally at the computing device 102, functionality of the content processing system 104 is also configurable as whole or part via functionality available via the network 114, such as part of a web service or "in the cloud." Digital content 106 is configurable in a variety of ways, examples of which include digital images, digital media, digital video, and any other form of content that is configured for rendering for display in a user interface 110 by a display device 112.

An example of functionality incorporated by the content processing system 104 to process the digital content 106 is illustrated as a vector object transformation system 116. This system is configured to generate a transformed vector object 118 (i.e., as a transformation of a first vector object 120) based on visual characteristics of the first vector object 120 and a second vector object 122 automatically and without user intervention, and thus increase creative customization capabilities while maintaining functionality of a mathematical representation. Vector objects are utilized in a variety of different scenarios, examples of which include stock images, as vector glyphs of a font 124, objects in a user interface or webpage, and so forth.

In the illustrated example, a continuum 126 is generated from the first vector object 120 and the second vector object 122 which includes a spectrum of transformed vector objects 118 with varying degrees of visual influence from the first vector object 120 and second vector object 122. To do so, a content creator, for instance, selects a first vector object 120 and a second vector object 122. In another example, a second vector object is suggested automatically and without user intervention based on characteristics of the first vector object 120 as further described below. As shown in FIG. 1, the first vector object 120 is a glyph of the letter "L" and the second vector object 122 is a vector image of a lighthouse.

A preparation module 128 is employed that accepts, as inputs, the first vector object 120 and second vector object 122 and from this generates a correspondence between the control points of each, e.g., as a mapping of control points 130. Lack of an appropriate mapping of control points (i.e., lack of accuracy) leads to transformations with visual artifacts, which diminishes the aesthetic value of the resulting transformed vector object 118.

Accordingly, a mapping module 132 is employed to generate the mapping of control points 130. The mapping module 132 is configured to determine an initial correspondence of control points using dynamic time warping, boost the initial correspondence using a cost graph, and balance the remaining control points using proportional insertions and handle balancing as further described herein.

The mapping of control points 130 is received by a transformation generation module 134, which is operable to generate the transformed vector object 118. The transformation generation module 134 includes an interpolation module 136, which is operable to adjust at least one control point of the first vector object 120, for instance based on properties of the corresponding control point of the second vector object 122. Accordingly, the interpolation module 136 uses linear interpolation performed among the properties of the control points such as their locations, roundness attributes, smoothness attributes, etc. to generate the transformed vector object 118. In this example, the interpolation in effect alters the visual appearance of the "L" glyph to "look more/less like" the lighthouse.

In the illustrated example, a continuum 126 is rendered for display, and includes a number of representations with varying levels of influence of the visual characteristics of the glyph "L" and the vector image of the lighthouse. As further illustrated, this further includes representations that have been extrapolated "beyond" or "away from" properties associated with the first vector object 120 or second vector object 122 leading to the generation of unique shapes which would otherwise be difficult to produce. Accordingly, the techniques described herein overcome the limitations of conventional techniques by enabling creative customization of vector objects based on visual characteristics of multiple vector objects, while maintaining functionality of a mathematical representation associated with vector output. Further discussion of these and other techniques are included in the following section and shown using corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Vector Object Transformation

Figure 2A:
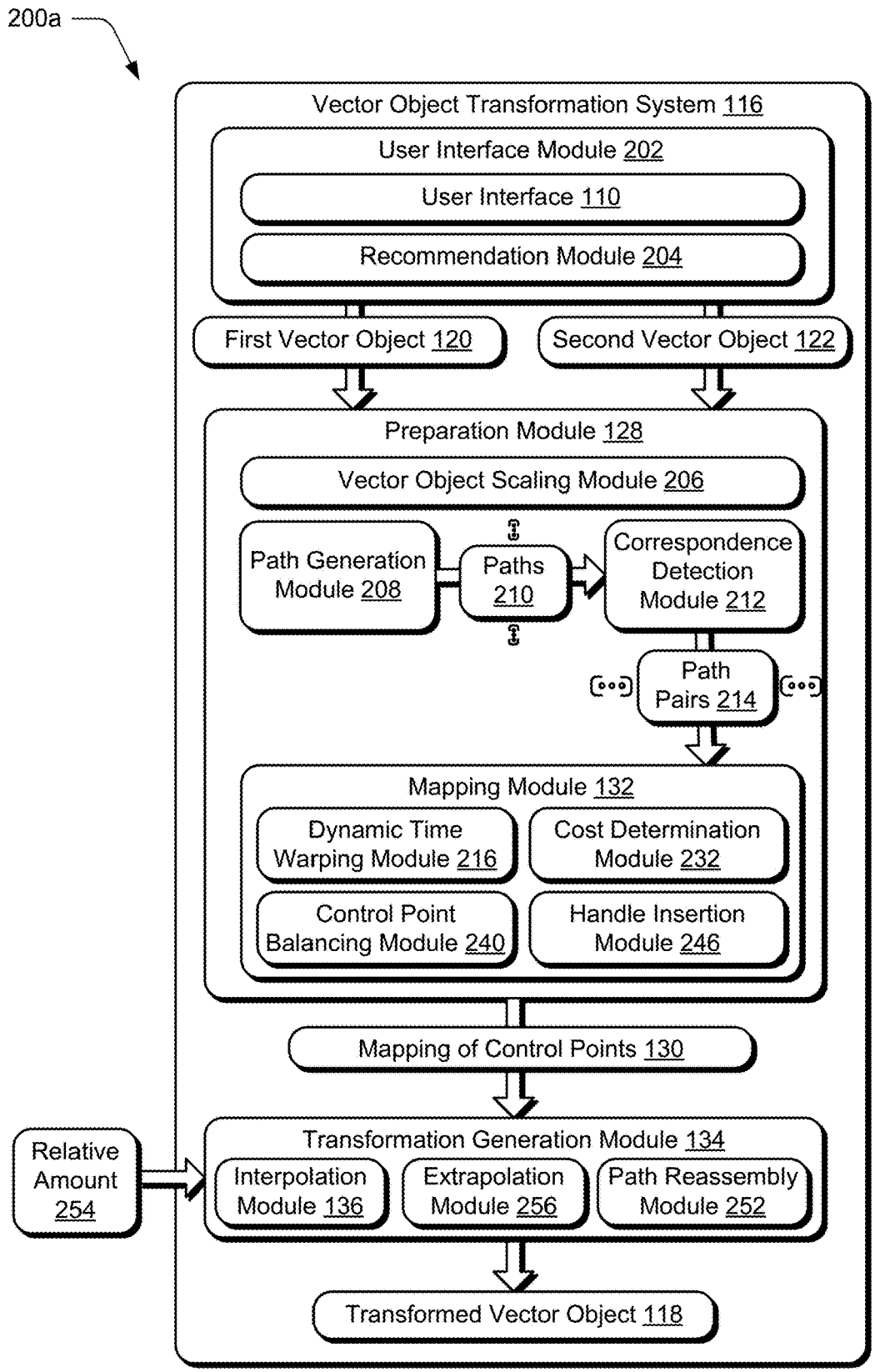
FIG. 2a depicts a system in an example implementation showing operation of a vector object transformation system of FIG. 1 in greater detail.
Figure 2B:
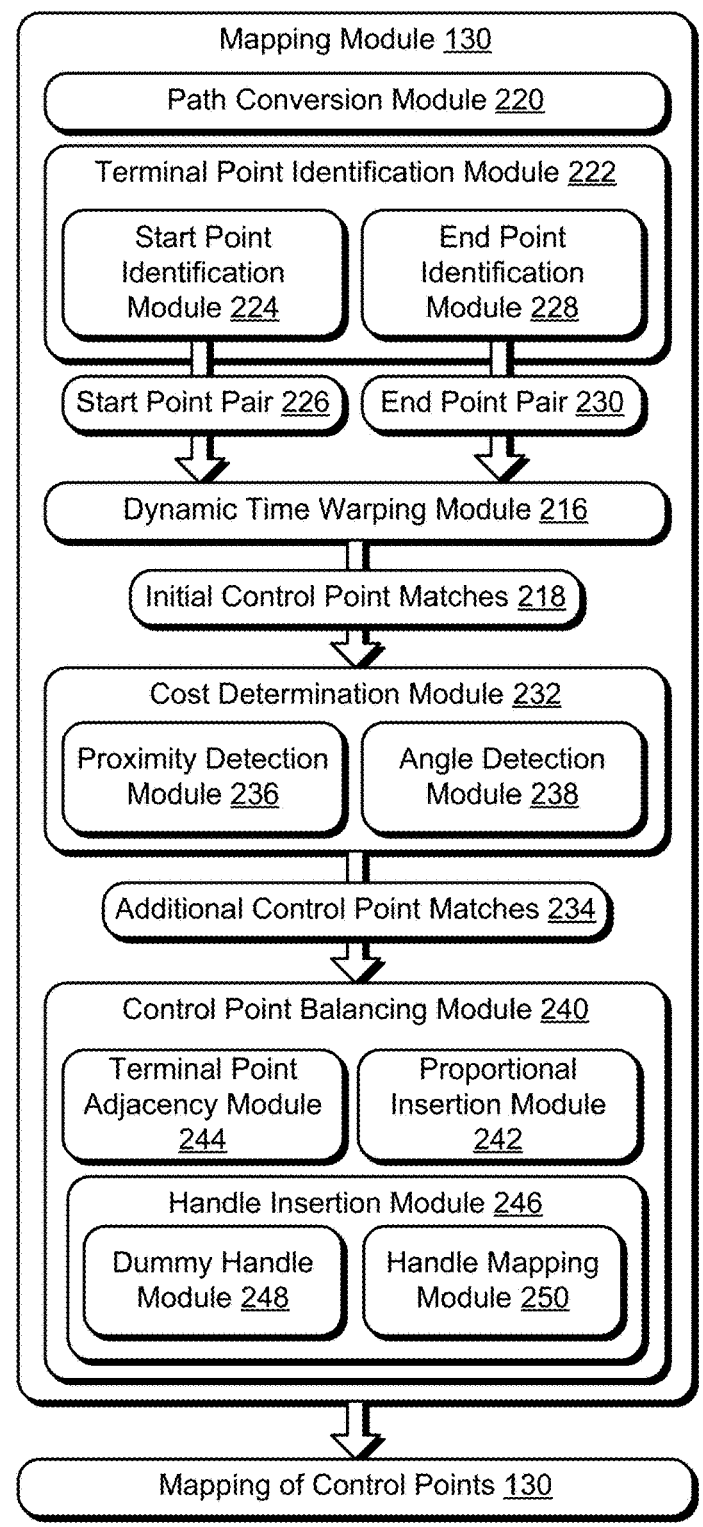
FIG. 2b depicts a system showing operation of a mapping module of the vector object transformation system of FIG. 2a in greater detail.
Figure 3:
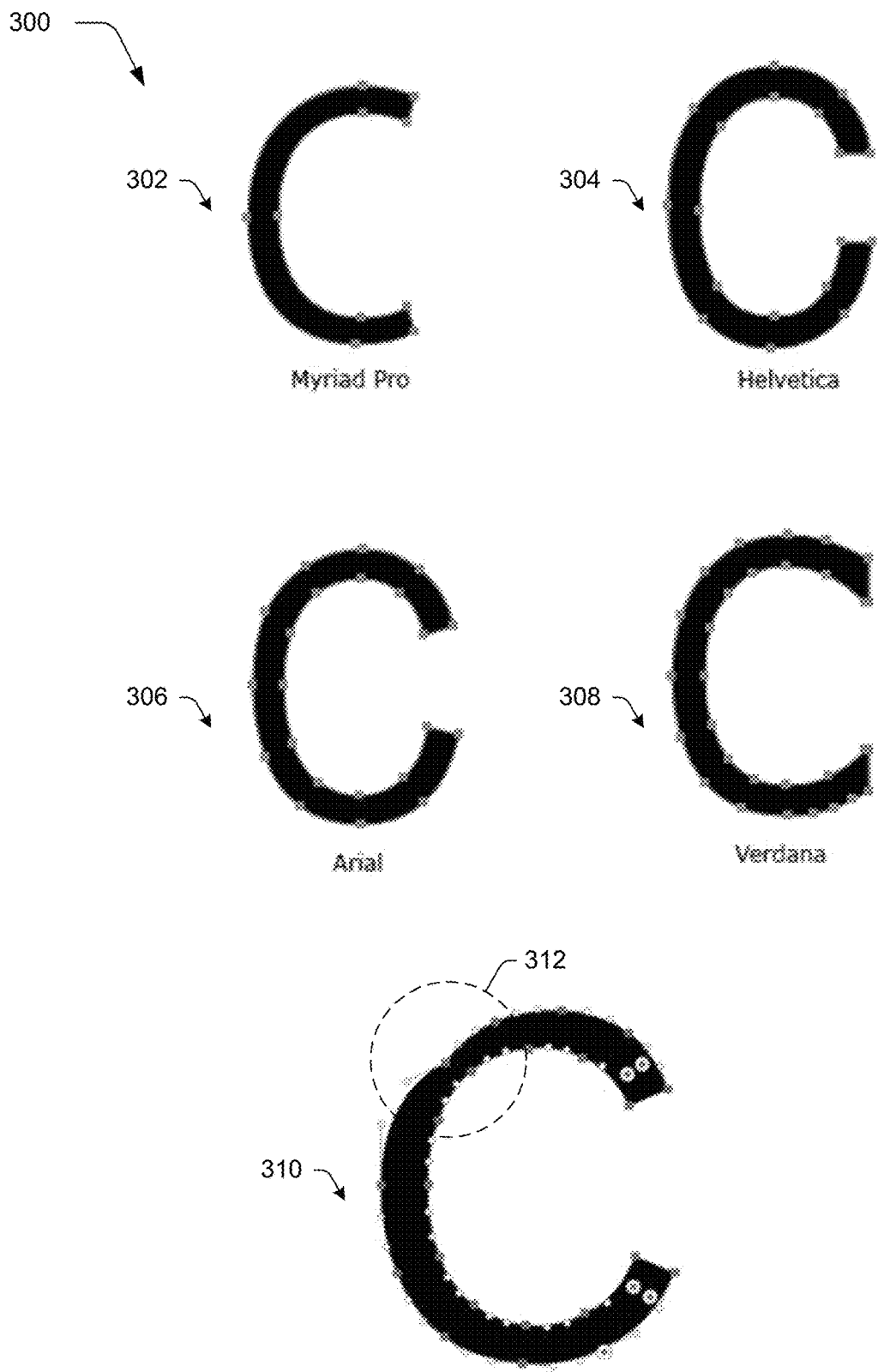
FIG. 3 depicts an example of a comparison between control points along paths of different fonts.
Figure 4:
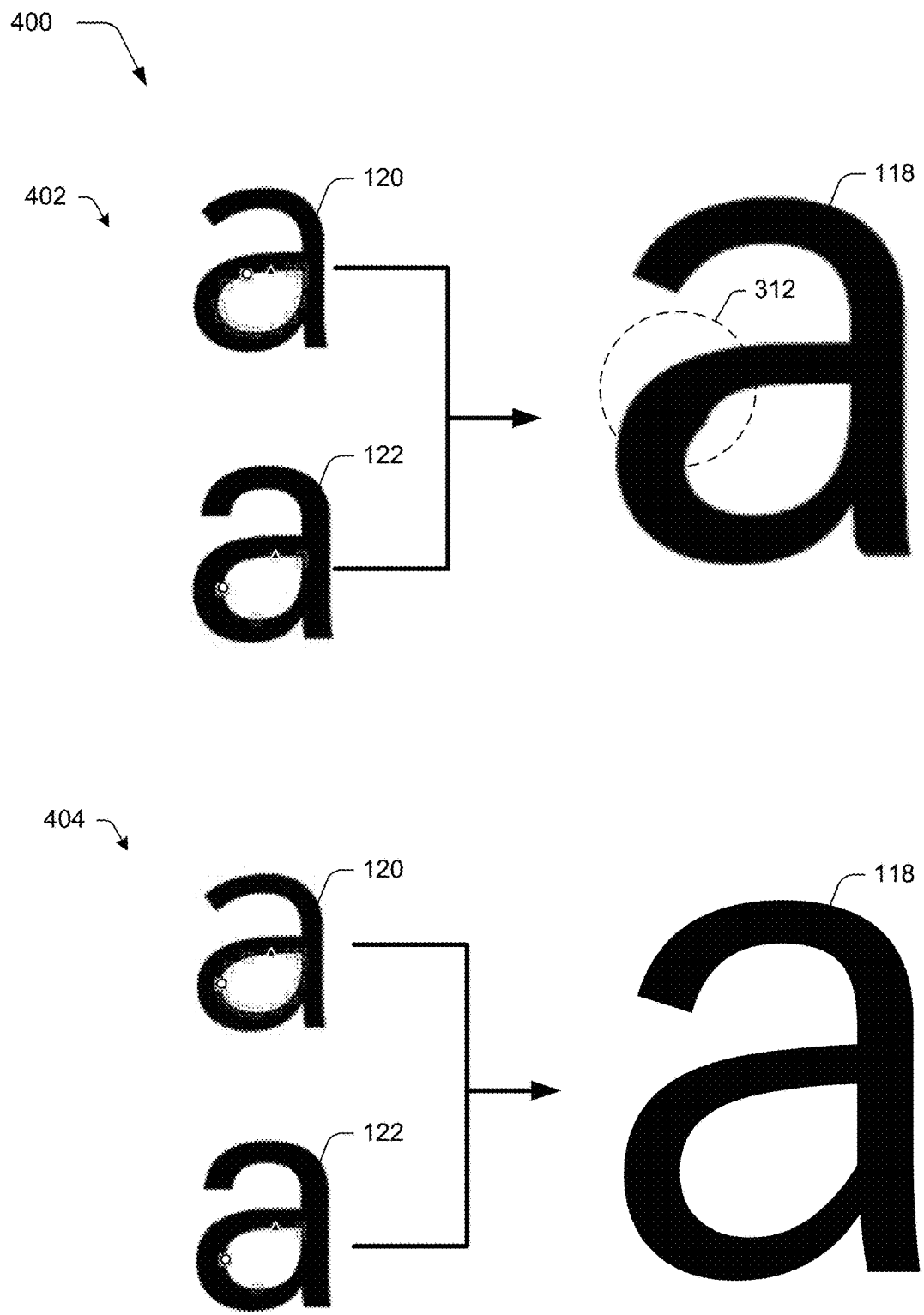
FIG. 4 depicts an example of faulty terminal point selection and corrected terminal point selection.
Figure 5:
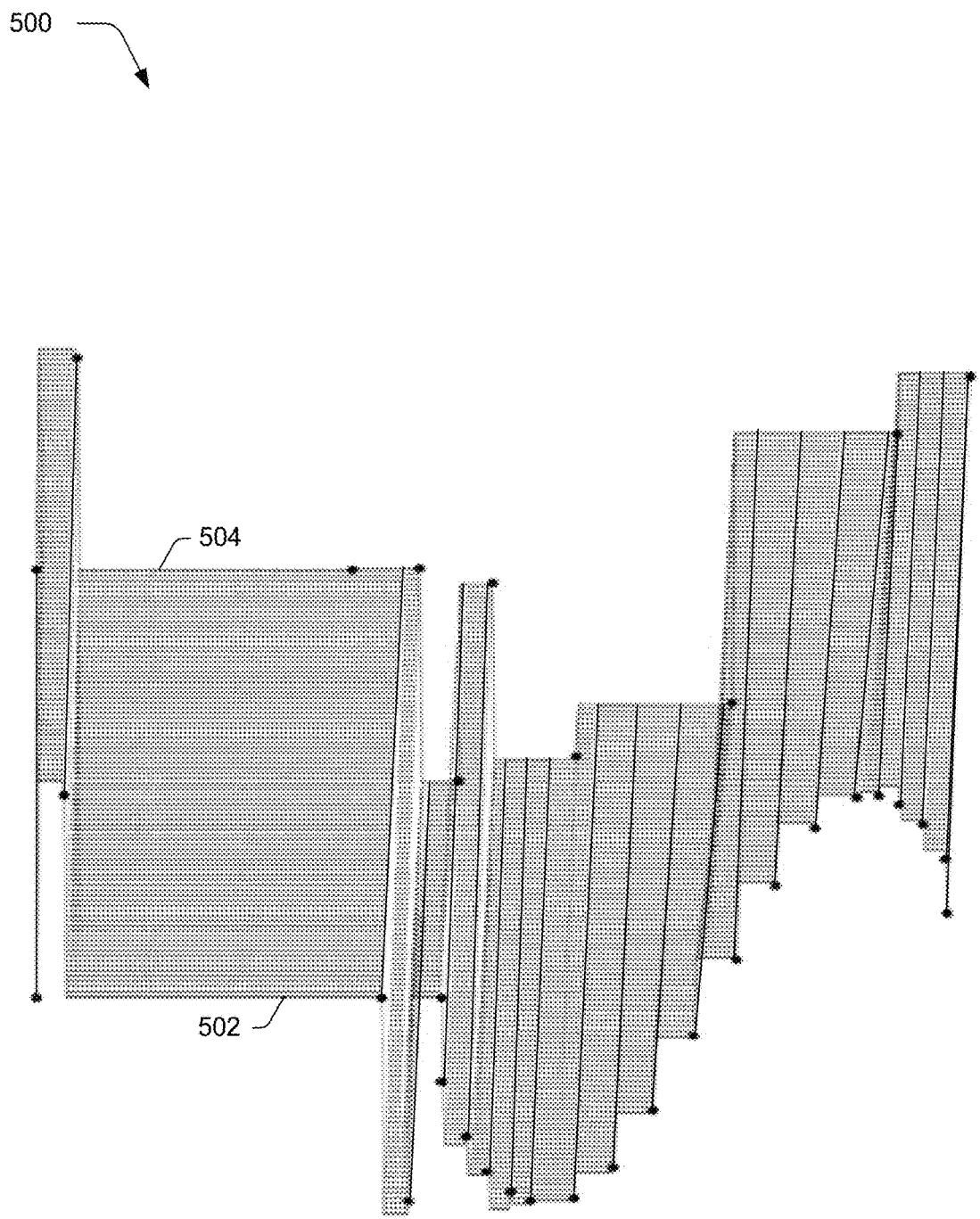
FIG. 5 depicts an example of dynamic time warping using corrected terminal points.
Figure 6:
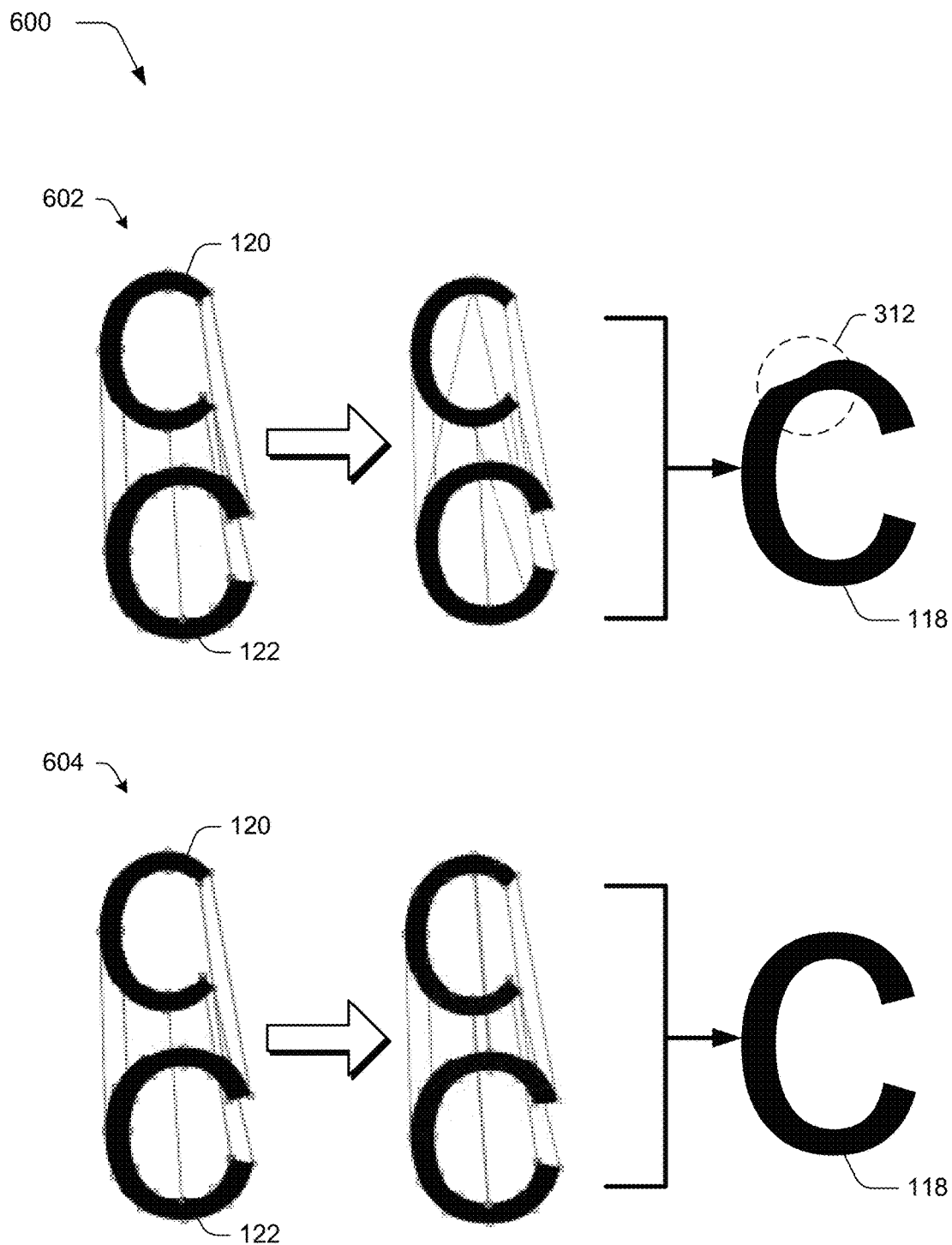
FIG. 6 depicts an example of greedy mapping compared to cost graph enhanced mapping of additional control points.

FIG. 2a depicts a system 200a in an example implementation showing operation of the vector object transformation system 116 in greater detail. FIG. 2b depicts a system 200b showing operation of a mapping module of the vector object transformation system 116 of FIG. 2a in greater detail. FIG. 3 depicts an example 300 of a comparison between control points along paths of different fonts. FIG. 4 depicts an example 400 of faulty terminal point selection and corrected terminal point selection. FIG. 5 depicts an example 500 of dynamic time warping using corrected terminal points. FIG. 6 depicts an example 600 of greedy mapping compared to cost graph enhanced mapping of additional control points.

Figure 7:
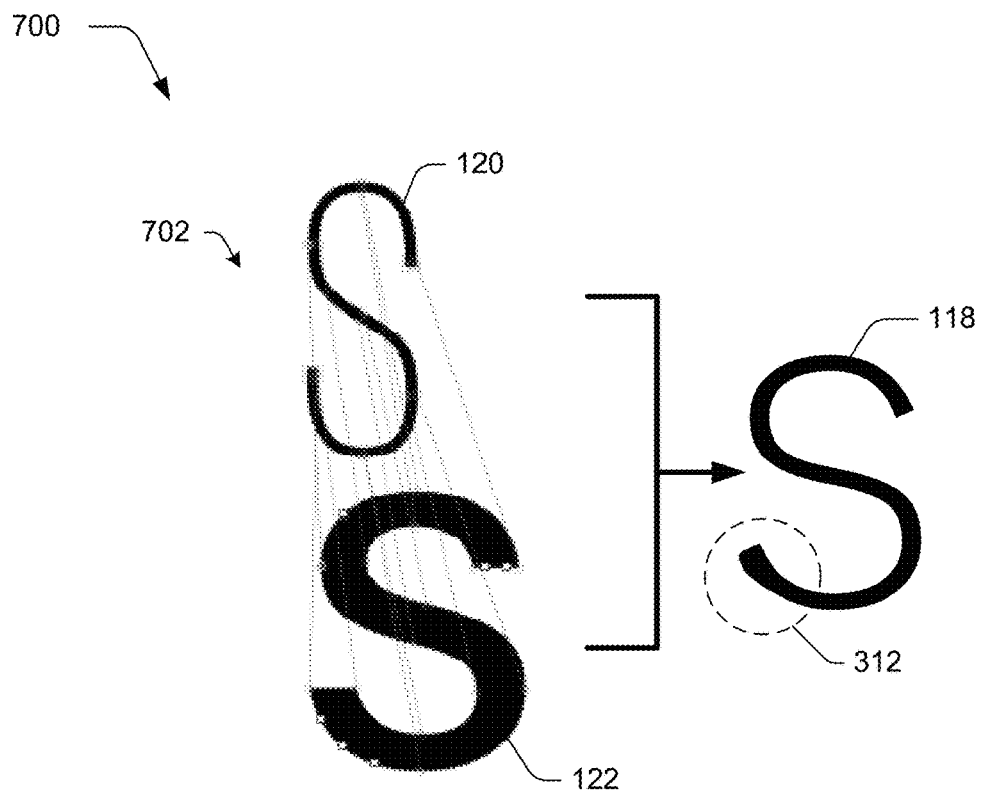
FIG. 7 depicts an example of uniform control point insertion compared to proportional control point insertion.
Figure 7:
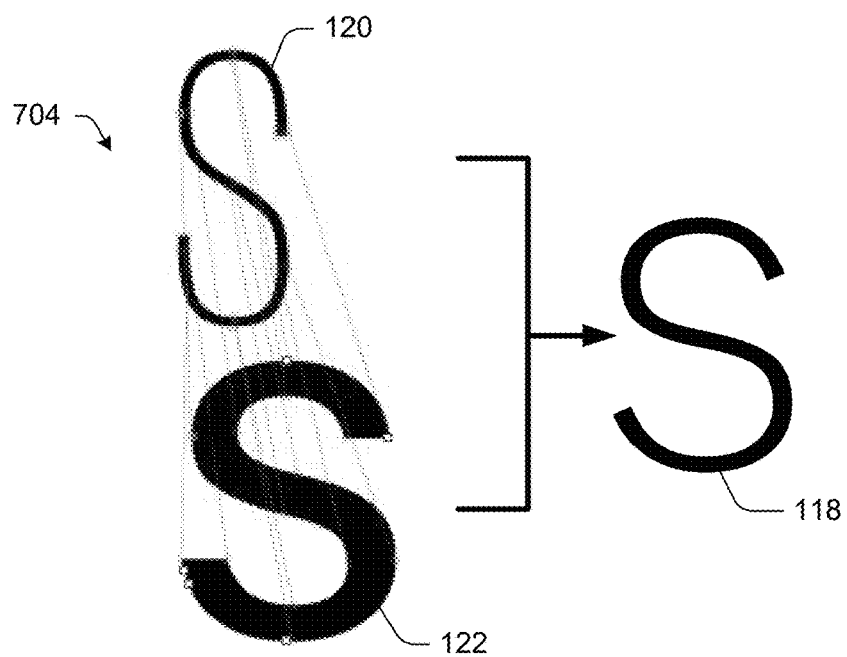
Figure 8:
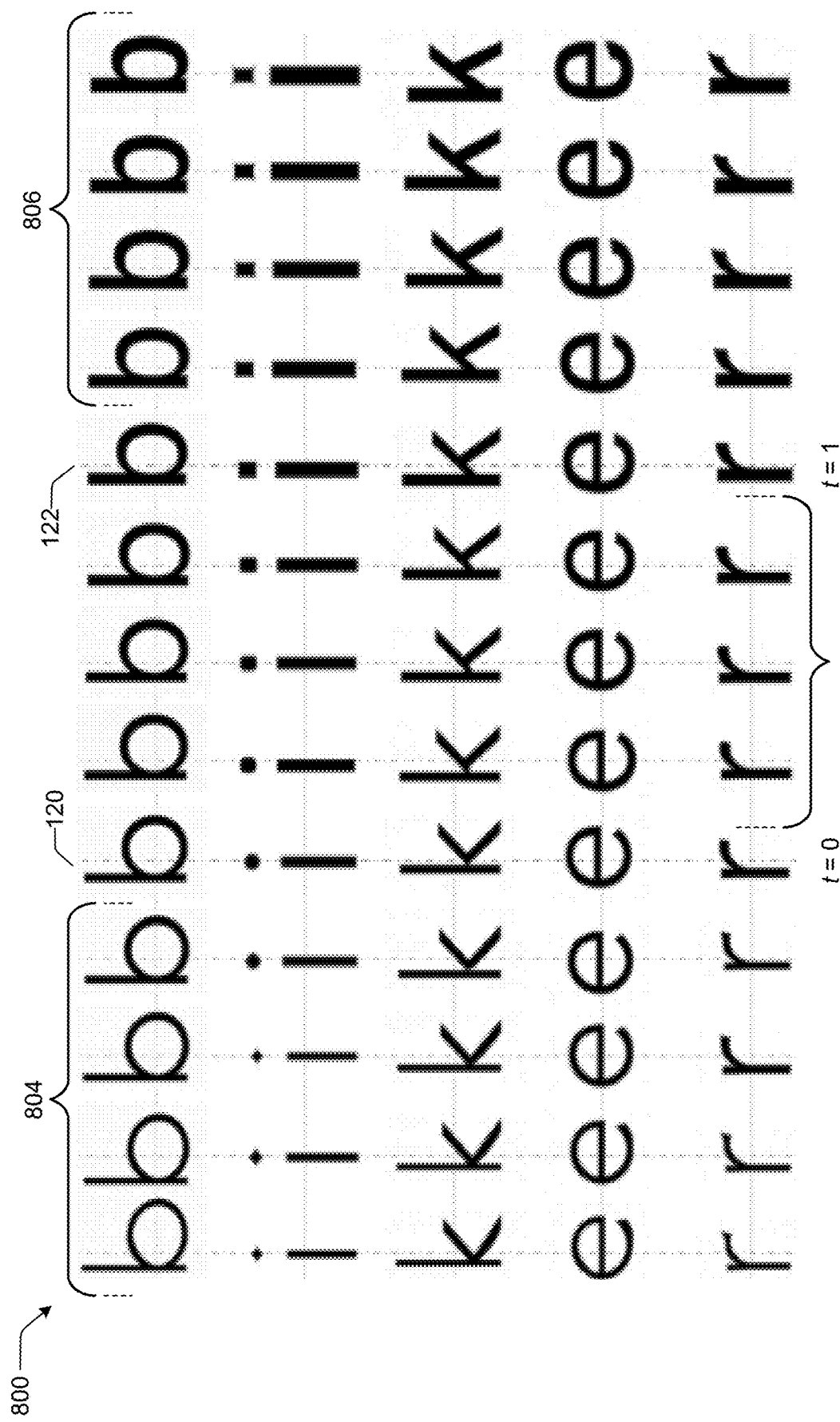
FIG. 8 depicts an example of vector object transformation for a text object.
Figure 9:
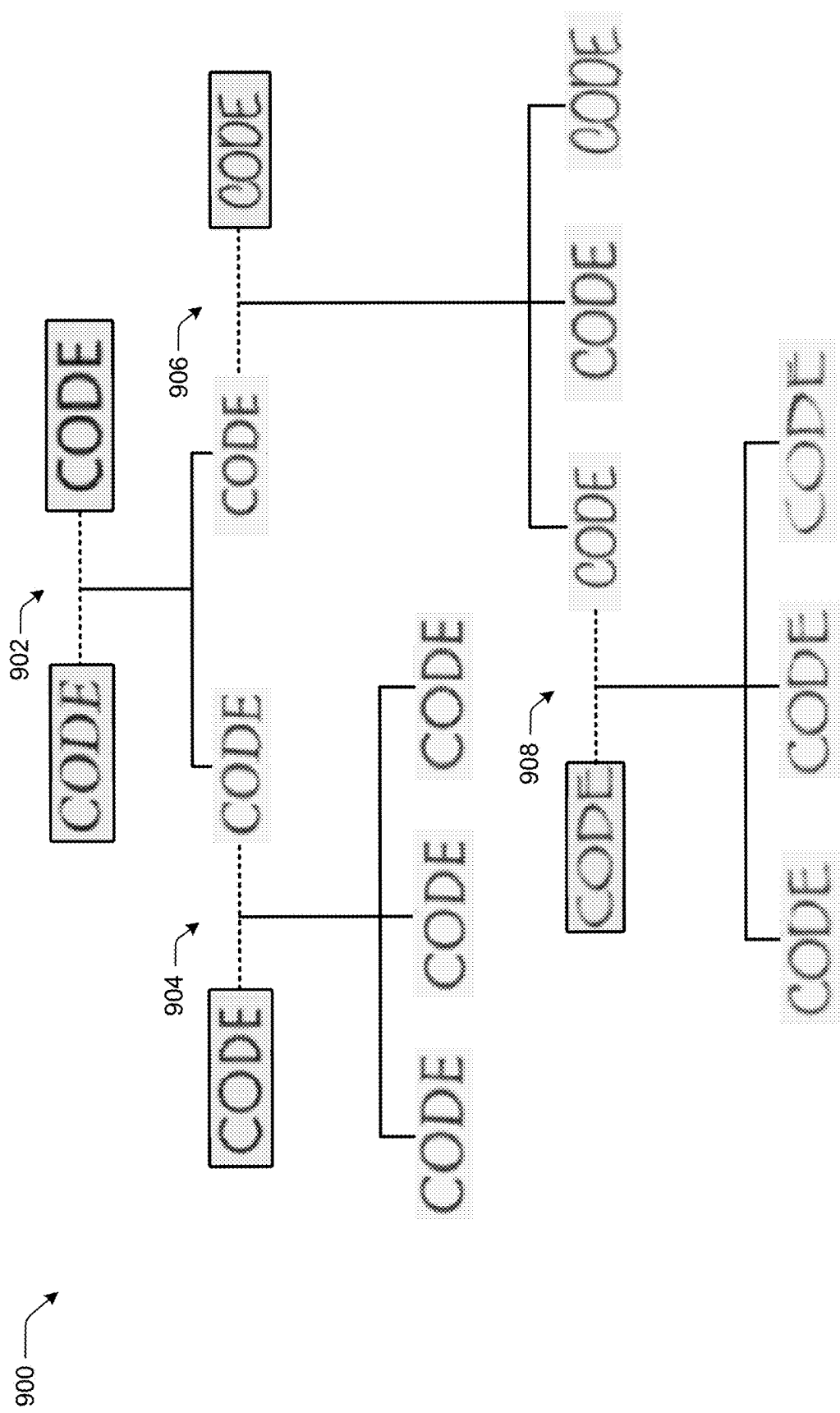
FIG. 9 depicts an example of multiple iterations of vector object transformation techniques.
Figure 10:
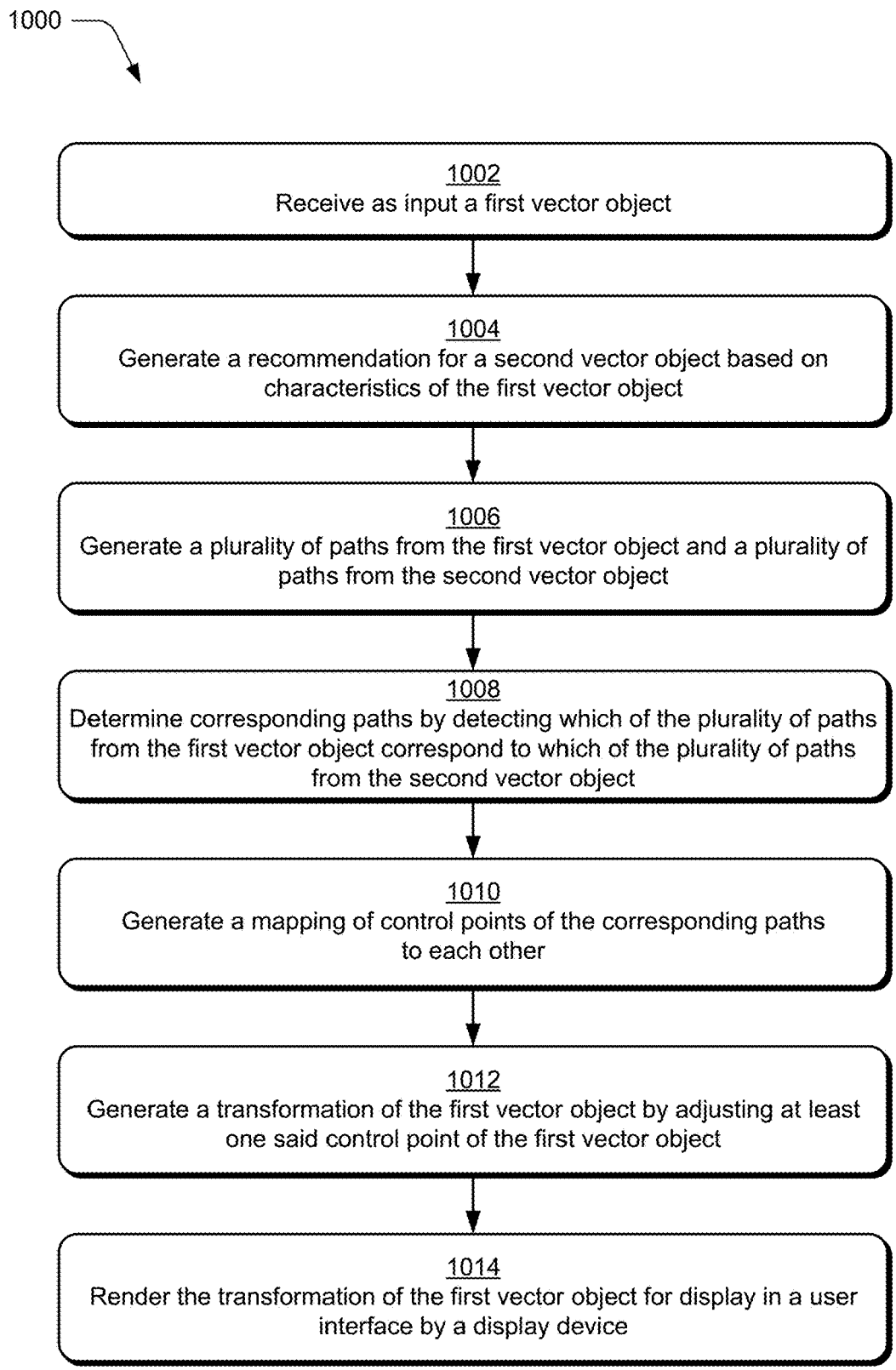
FIG. 10 is a flow diagram depicting a procedure in an example implementation of vector object transformation.
Figure 11:
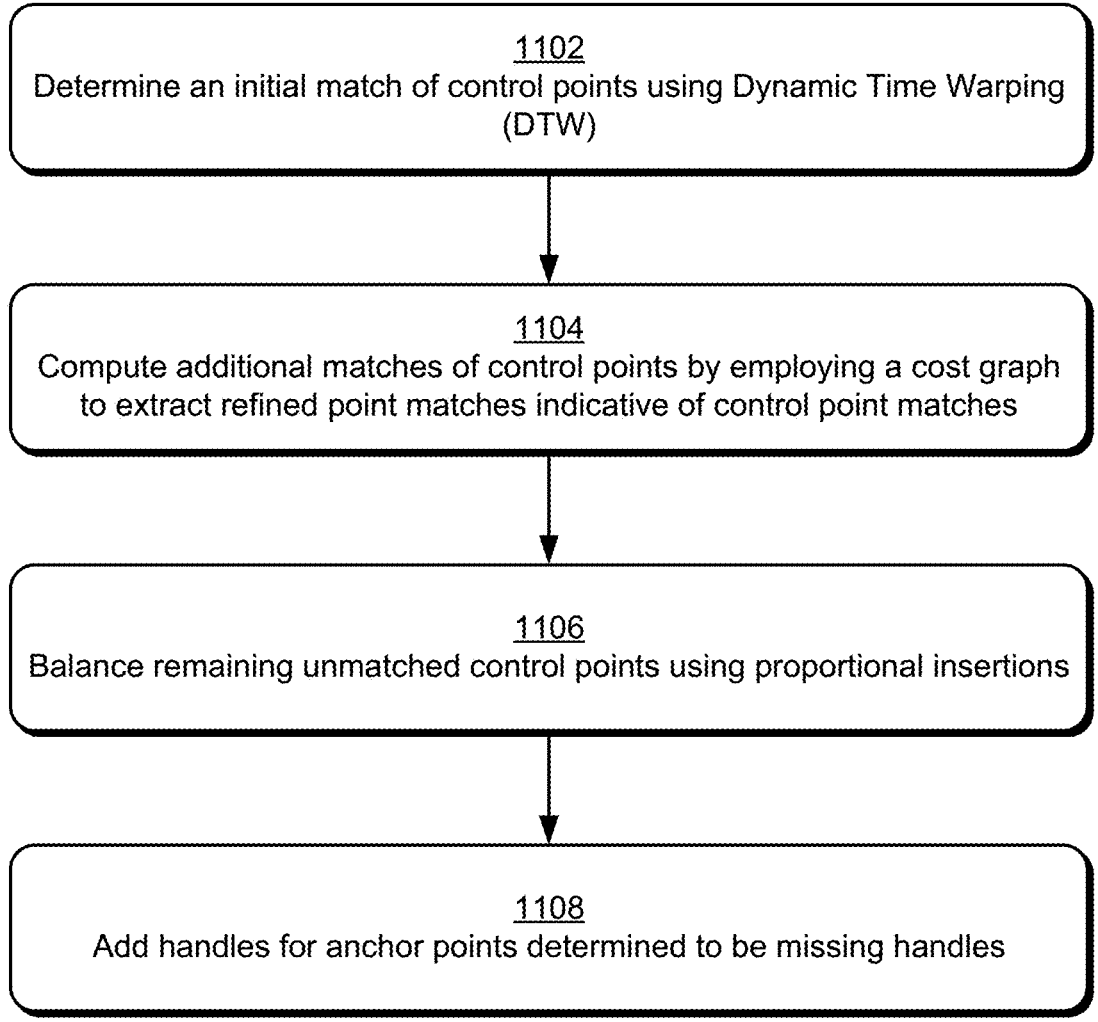
FIG. 11 is a flow diagram depicting a procedure in an example implementation of vector object transformation including generating a mapping of control points in greater detail.

FIG. 7 depicts an example 700 of uniform control point insertion compared to proportional control point insertion. FIG. 8 depicts an example 800 of vector object transformation for a text object. FIG. 9 depicts an example 900 of multiple iterations of vector object transformation techniques. FIG. 10 depicts a procedure 1000 in an example implementation of vector object transformation. FIG. 11 depicts a procedure 1100 in an example implementation of vector object transformation including generating a mapping of control points in greater detail.

The following discussion describes techniques that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-11.

To begin in this example, the vector object transformation system 116 is employed to receive as input a first vector object 120 (block 1002). For instance, a user interface module 202 is configured to output a user interface 110, e.g., to receive a user input specifying a first vector object 120. In a first instance, the vector object transformation system 116 also receives as input a second vector object 122, e.g., by receiving a user input specifying the second vector object 122. In another instance, a recommendation module 204 is operable to generate a recommendation for the second vector object 122 based on characteristics of the first vector object 120 (block 1004). For instance, based on a scoring metric indicating a similarity of visual characteristics between the first vector object 120 and the second vector object 122. In another example, the recommendation is based on a cost analysis to generate a transformation of the first vector object 120.

Consider a font example where the first vector object 120 is a text object of a source vector font. Based on characteristics of the first vector object 120, a recommendation is generated by the vector object transformation system 116 for a second vector object 122, in this case a text object of a target vector font. To do so, an in-memory copy of the text object of the source vector font is created. One-by-one, the text object of the source vector font is transformed, using the techniques described below, to available fonts maintained in the storage device 108. The DTW cost to transform the text object of the source vector font to a text object of the available fonts is computed. The results of the computation are sorted, for instance in a ranked order of increasing cost. Accordingly, fonts with similar visual characteristics to the source vector font have a low DTW cost. One or more fonts are then recommended based on the cost, for instance, as a recommendation for a "most similar" font, as an ordered list below a threshold level of cost, to find dissimilar fonts, and so forth.

Regardless of the origin of the second vector object 122, a preparation module 128 of the vector object transformation system 116 is configured to receive the first vector object 120 and second vector object 122 as input (e.g., a text object of a source vector font and of a target vector font). A vector object scaling module 206 scales the first vector object 120 and the second vector object 122, e.g., to a defined bounding rectangle size. For instance, the vector object scaling module 206 scales the vector objects to a bounding box of 100×100 pixels, while maintaining the aspect ratios of the first vector object 120 and second vector object 122.

A path generation module 208 is then employed to generate a plurality of paths 210 from the scaled first vector object 120 and scaled second vector object 122 (block 1006). Vector objects are configurable with a variety of path configurations, such as paths 210 composed of lines and curves that include configurations such as compound, disjoint, and so forth. For example, a glyph of the letter "i" has two paths, a glyph of the letter "a" has two paths in a compound path setup, and a glyph of the number "8" has three paths is a compound path arrangement.

Accordingly, the path generation module 208 separates constituent paths 210 used to form the first vector object 120 and second vector object 122, e.g., as Bezier curves. In a font example, where the vector objects are glyphs of text objects, each glyph is processed one-by-one, and individual paths 210 from each glyph are also processed one-by-one and later reassembled as further described below.

The paths 210 are then received as input by a correspondence detection module 212. The correspondence detection module 212 is configured to generate path pairs 214 by determining which paths 210 from the first vector object (i.e., source paths) correspond to which paths 210 from the second vector object (i.e., target paths) (block 1008).

Because the vector objects have differing visual characteristics, the paths 210 of the vector objects have differing count, density, and relative location of control points. Control points include handles and anchor points, which are definable as smooth points and corner points. In various examples, corner points include straight corner points, curved corner points, and/or combination corner points. Further, each anchor may have an optional "in-handle" and "out-handle" associated with it. Not having any handle makes the point a corner, while having handles rounds the curve at the anchor.

As shown in an example 300 of FIG. 3, vector objects 302, 304, 306, and 308 represent a glyph of the letter "C" in a variety of respective input fonts. Each glyph has a different number of control points, shown in example 300 as grey squares, with varying separation and density. In the illustrated example, the "C" vector glyph at 302 in the font Myriad Pro is shown as defined by ten anchor points, with non-uniform distribution, while the "C" vector glyph at 308 in the Verdana font is shown as defined by twenty-eight anchor points with a relatively consistent distribution.

The vector object 310 illustrates an example of generating a subsequent transformation (e.g., interpolation) without first generating a one-to-one mapping of control points 130 between two vector objects with different number and distribution of control points. For instance, an attempted interpolation between the "C" glyph in the Arial font at 306 and the "C" glyph in the Helvetica font at 304. As shown, the transformed vector object 118 includes a visual artifact 312, which diminishes its aesthetic value.

Accordingly, a mapping module 132 of the vector object transformation system 116 is employed to generate the mapping of control points 130 of the corresponding paths to each other (block 1010) before generating a transformed vector object 118. The objective in generating the mapping of control points 130 in this example is to equalize the number of control points in each path of the path pairs 214 and match their relative locations. In other words, to produce an in-order bipartite matching between the control points of paths of the first vector object 120 and the control points of corresponding paths of the second vector object 122. This is done in several stages that include initial correspondence deduction using dynamic time warping, boosting the initial correspondence using a cost graph, balancing the control points, and inserting remaining handles as described below.

To find an in-order bipartite match, a dynamic time warping module 216 is employed to perform dynamic time warping (DTW) to find initial control point matches 218 of each path of the path pairs 214. DTW provides a mechanism to compare two temporal series of possibly unequal lengths and find an optimal mapping of each of the sampled points between terminal points (i.e., start and end points) of the series. For example, in a logical table of cost of movement from every point in the first series to every point in the second series, DTW looks for the shortest cost path from first row (or column) in the table to the last. The path is composed of horizontal, vertical, or diagonal movements to adjacent cells in the table. To produce in-order results, only next rows (or columns) are considered in the path.

To perform DTW, a path conversion module 220 converts each path of the path pair 214 to a series of uniformly separated points to create two series of data suitable for comparison by DTW. This is done, for example, by sampling the paths 210 at relatively small distances and computing X/Y gradients (i.e., horizontal and vertical offsets) among adjacent sample points. Additionally, a terminal point identification module 222 is employed to pre-match the terminal points (i.e., a start and endpoint) of the two series. The terminal points are pre-matched, for instance, via a start point identification module 224 to determine a correctly mapped start point pair 226. Similarly, an end point identification module 228 is operable to determine a correctly mapped end point pair 230. In an example, the start point pair 226 is determined first, and the end point pair 230 is determined implicitly as the points that immediately precede the start points.

The start point in the source path (i.e., a path from the first vector object 120) is determined by calculating the average distance between adjacent anchors in the target path (i.e., a path from the second vector object 122) and finding the adjacent point pair in the source path that has the least absolute deviation from the average distance. To find a corresponding start point in the target path, in an example a brute force search is performed by testing each target anchor point as the corresponding start point and computing the associated DTW cost. In this example, the anchor point with the lowest DTW cost is the corresponding start point.

However, in examples with a high number of anchor points, a brute force search consumes significant amounts of computational resources and as a result is not performable in real time. In such an example, the search for a corresponding start point is optimized by searching in a narrow or progressively widening search radius around the target anchor point that is closest to the source start point. In this way, the start point identification module 224 can effectively identify start point pairs while conserving computational resources.

In some embodiments, the selection of start and end points is further optimized by moving the start point or the end point away from the initially selected one and determining if this reduces the DTW cost. This is iteratively repeated until the DTW cost is effectively minimized, or until a threshold distance away from the initially selected start or end point is reached. The correctly mapped start point pair 226 and end point pair 230 are then assigned as the start and end points of the respective DTW series. In this way, start and end points are obtained with near uniform separation, which minimizes artifacts in the transformed vector object 118.

As shown in an example 400 of FIG. 4, illustrated in first and second stages 402 and 404, visual artifacts result from incorrect terminal point selection. First stage 402 represents selecting terminal points that have non-uniform separation. The start point for each vector object is illustrated as a white dot, while the end point is illustrated as a black triangle. As illustrated in first stage 402, there is a significant gap between the locations of the start points between the first vector object 120 and the second vector object 122. Consequently, a subsequent attempt to generate a transformed vector object 118 results in a visual artifact 312.

In contrast, second stage 404 represents terminal point selection using the optimization and improvement techniques described above. In this example, the start point of the first vector object 120 is corrected so that it accurately matches the start point of the second vector object 122. While in this particular example the start point of the source glyph is improved, other implementations are also considered. For instance, improving accuracy of either or both the start and end points of either or both the first vector object 120 and the second vector object 122. Accordingly, a subsequent generation of the transformed vector object 118 is artifact free, as shown in second stage 404, and is of superior visual quality when compared with the non-optimized terminal point selection as in 402.

With the determined start and end points, the dynamic time warping module 216 is operable to use DTW to determine initial control point matches 218, e.g., anchor point matches (block 1102). An example 500 of DTW using corrected terminal points is shown in FIG. 5. In the example, the path of the first vector object 120 (i.e., the source path) is shown at 502, and the path of the second vector object 122 (i.e., the target path) is shown at 504. Control points of each path are shown as solid black circles, and DTW mappings from source anchor points are shown as solid black lines.

Notably, while several control point to control point matches are present, the source control points do not necessarily map to target control points. In some cases, rather, this includes sampled points in between the control points. This is because the DTW computed mappings represent a correspondence between sampled points, which are not necessarily control points. Accordingly, available control point mappings are extracted from the results of DTW, and the additional mappings are computed as described below.

One example involving computation of the remainder of the mappings is to use "greedy mapping" to assign the leftover unmapped control points. For each control point in the source path that does not have a control point match in the target path, for instance, the unmatched control point in the target path that is closest to the DTW mapped sample point in the target path is found. However, this approach results in uneven spatial separation between control points, which ultimately results in a propensity for artifacts in the transformed vector object 118.

Accordingly, in another example, a cost determination module 232 is employed to compute additional control point matches 234 by employing a cost graph to extract refined point matches indicative of control point matches (block 1104). In this example, the cost graph measures the cost of mapping a control point of the source path to unmapped control points in the target path. To generate the cost graph, a proximity detection module 236 is operable to determine the proximity of a DTW mapped target path sample point to target path control points. An angle detection module 238 is employed to determine the angle equivalence between source and target control points. For instance, the difference between angles subtended at a source control point (by directed vectors from its previous and next control points) and at the corresponding target anchor, by directed vectors from its previous and next control points.

The cost of mapping is thus based on both the proximity of the mapped target sample point to target control points, as well as angle equivalence between source and target control points. By taking into consideration the angles, the tracking of curvature changes in both the source path and the target path has increased accuracy and results in increased control precision in the control point mappings. Considering angles also provides an added level of validation, for instance, in resolving mappings produced by DTW where the mapped control points are spatially close to one another. Accordingly, use of the cost graph based on relative offset of control points as well as angle equivalence between source and target control points results in a highly accurate mapping of additional control points between the two paths, which reduces artifacts in subsequent transformations, e.g., interpolation, extrapolation.

As shown in an example 600 of FIG. 6, illustrated in first and second stages 602 and 604, visual artifacts 312 result from ineffective control point determinations. For instance, at first stage 602 the leftmost pair of glyphs illustrate the initial control point matches 218 obtained from the dynamic time warping module 216. Control point matches between the first vector object 120 and second vector object 122 are shown using grey lines. Progressing to the pair of glyphs in the center at 602, the remaining anchors are determined using greedy mapping. However, as noted above, this results in uneven spatial separation between control points, and when generating a transformation (e.g., interpolation) is likely to lead to visual artifacts 312 as illustrated.

Second stage 604, on the other hand, demonstrates computing additional control point matches 234 using a cost graph as described above. As in 602, the leftmost pair of glyphs in second stage 604 illustrate the initial control point matches 218 obtained from the dynamic time warping module 216. Progressing to the pair of glyphs in the center at 604, however, the remaining anchors are determined using a cost graph. As illustrated, the additional control point matches 234 have increased topological accuracy. For instance, the bottom most anchor in the first vector object 120 maps to the bottom most anchor in the second vector object 122, the left most anchor in the first vector object 120 maps to the left most anchor in the second vector object 122, etc. Accordingly, the transformed vector object 118 generated with a subsequent interpolation is free of artifacts.

Once the control points from the source path (i.e., a path from the first vector object 120) and target path (i.e., a path from the second vector object 122) are logically mapped as described above, the next step in this example before generating a transformation is to ensure that the source path and target path have the same number of control points. For instance, in some examples the number of control points from the source path does not match the number of control points in the target path. Accordingly, a control point balancing module is employed to balance the remaining unmatched control points, e.g., anchor points and handles.

Although anchor points may be inserted uniformly to the deficient path (i.e., the path of the path pair 214 with fewer anchors) this may lead to uneven spacing, which results in artifacts in the transformed vector object 118. Therefore, a control point balancing module 240 instead balances the remaining unmapped control points using proportional insertions (block 1106). In an example where additional anchor points are to be inserted into the source path, a proportional insertion module 242 determines intercepts from corresponding anchors in the target path and inserts anchor points at the same intercepts in the source path. In another example, where the anchors are to be inserted in the target path, the proportional insertion module 242 computes intercepts from the corresponding source path. Anchor points are then inserted to the target path at the computed intercepts. In this way, consecutive anchor points are evenly placed in both the paths.

Further as part of this process, a terminal point adjacency module 244 is employed to determine whether the terminal points (i.e., start and end points) in either the source path or target path are adjacent to one another, or if there are additional control points in between them. If there are additional control points in between the terminal points for either path, new control points are introduced to the deficient path using proportional insertions as described above.

As shown in an example 700 of FIG. 7, illustrated in first and second stages 702 and 704, visual artifacts 312 result from uniform insertion of control points. For instance, at first stage 702 the pair of glyphs illustrate the control point mappings using uniform insertion. In this case, the control points that have been inserted into the second vector object 122 (e.g., the target glyph) are illustrated as white and black squares. However, uniform insertions result in uneven spacing between consecutive source and target anchor points which subsequently leads to a propensity for visual artifacts 312 in the transformed vector object 118.

On the other hand, second stage 704 illustrates balancing the remaining unmatched control points using proportional insertions. As above, the control points that have been inserted into the second vector object 122 are illustrated as white and black squares. In second stage 704, however, the control points are inserted to the target glyph in accordance with the topology of the source glyph. Accordingly, a subsequent generation of the transformed vector object 118 is artifact free, as shown in second stage 704, and is of superior visual quality when compared with the uniform insertions shown in 702. While in this example control points are inserted into the target path, in other examples control points are inserted into the source path or both the source path and the target path.

Further, a handle insertion module 246 is configured to add handles to anchors which are determined to be missing them (block 1108). For instance, each anchor point has an optional in-handle and an optional out-handle associated with it. Not having any handle at a particular anchor makes the Bezier curve a corner, while having handles rounds the Bezier curve at the anchor. For all missing handles, a dummy handle module 248 is employed to create and insert artificial handles at the same location as the corresponding anchor from the other path of the path pair 214. In this way, there are two handles per anchor. A handle mapping module 250 is employed to map the in-handles and out-handles for each anchor point in the first vector object 120 to the in-handles and out-handles for each corresponding anchor point in the second vector object 122. Accordingly, after balancing the remaining unmatched control points, the source and target path have an accurate and balanced (i.e., one-to-one) mapping of control points 130.

The mapping of control points 130 is received by a transformation generation module 134, which is operable to generate the transformed vector object 118. In an example where the first vector object 120 and second vector object 122 include more than one path, the paths are transformed one by one, and a path reassembly module 252 reassembles the transformed paths to form the transformed vector object 118. Transformations are generated by adjusting at least one control point of the first vector object, for instance based on properties of the corresponding control point of the second vector object 122 (block 1012). In an example, an interpolation module 136 performs linear interpolation among the properties of the control points such as their locations, roundness attributes, smoothness attributes, etc. In a font example, uniform movement of the mapped control points in a text object of a source vector font produces a new vector state of the path, and thus a text object in a custom font.

In another example, separate continua are generated for different discrete properties of the control points, thus enabling control over a particular property. In a font example, fonts with several variations on a parameter are assigned discrete states on a derived axis. For instance, fonts like Avenir Light, Avenir Medium, Avenir Heavy with similar visual properties other than weight, can be automatically assigned discrete states on a derived axis (e.g., a "heaviness" axis). Accordingly, infinite states between and beyond the three fonts sitting on a linear axis are produced.

In one or more examples, the transformation is based on a relative amount 254 of influence of the second vector object 122 on the first vector object 120. For instance, the control points of the first vector object 120 are adjusted to an extent determined by the relative amount 254. In one example, the relative amount 254 is received as user input received via a user interface 110, for instance, as a specified amount of influence of the second vector object 122 on the first vector object 120. In another example, the relative amount 254 is determined automatically and without user intervention, for instance based on a preset level of influence.

In an implementation, the transformation generated based on the relative amount 254 is defined by the following equation:

$$p_r = p_s * (1-t) + p_s * t$$

where, $p_r$ is the resultant property value after interpolation (or extrapolation), $p_s$ is the source glyph property value, $p_t$ is the target glyph's property value, and t is the relative amount. The first vector object 120 is represented by the intercept t=0 while the second vector object is represented by t=1. As such, a t-value of 1 would result in a transformed vector object 118 having a visual appearance identical to the second vector object 122, while a t-value of 0 would result in a transformed vector object 118 having a visual appearance identical to the first vector object 120.

In some examples, an extrapolation module 256 is employed to extrapolate the properties of the control points in generating the transformed vector object 118. For instance, generating the transformation includes extrapolating properties associated with a control point of the first vector object 120 away from properties associated with the corresponding control point of the second vector object 122. Following the example above, this would correlate to a negative t-value. In another example, generating the transformed vector object 118 includes extrapolating properties associated with a control point of the first vector object 120 beyond properties associated with the corresponding control point of the second vector object 122. This would correlate to a t-value greater than one. In an example, after a transformed vector object 118 is generated by interpolation or extrapolation, the transformed vector object 118 is rendered for display in a user interface 110 by a display device 112 (block 1014).

In an example 800 of FIG. 8, a first vector object 120 includes a vector text object "biker" in a source vector font (t=0). The second vector object 122 is a vector text object "biker" in a target vector font (t=1). The illustrated text objects at 802 represent transformed vector objects 118 that have been interpolated to depict font states "in-between" the source vector font and target vector font. That is, (0<t<1). Accordingly, the text objects included in 802 exhibit visual characteristics of both the first vector object 120 (i.e., the source vector font) and the second vector object (i.e., the target vector font). For instance, from t=0 to t=1, the shape of the dot in the glyph "i" progressively changes from a circle to a square.

The illustrated text objects at 804 represent transformed vector objects 118 that have been extrapolated to depict font states "away from" the target vector font. That is, (t<0). Accordingly, the text objects included in 804 amplify visual characteristics of the first vector object 120 (i.e., the source vector font) however reduces visually similar characteristics of the second vector object (i.e., the target vector font). For instance, as shown the target vector font is thicker than the source vector font. Accordingly, as t decreases (t<0), the vector text object "biker" becomes progressively thinner.

The illustrated text objects at 806, on the other hand, represent transformed vector objects 118 that have been extrapolated to depict font states "beyond" the target vector font. That is, (t>1). Accordingly, the text objects included in 806 amplify visual characteristics similar to the second vector object 122 (i.e., the target vector font) and further reduces visual similarity to the first vector object (i.e., the source vector font). For instance, as t increases (t>1), the vector text object "biker" becomes progressively thicker.

In another example 900 of FIG. 9, multiple iterations of generating custom fonts are shown at first, second, third and fourth stages 902, 904, 906, and 908. In this example, input fonts, for instance fonts that are previously defined (e.g., Arial, Times New Roman) are illustrated in black boxes. As shown at first stage 902, two defined input fonts are interpolated to produce customized font states, two of which are shown. These two customized font states are each interpolated further with a different input font, for instance at stages 904 and 906 to produce a "second generation" of customized fonts.

A third iteration of this process is shown at fourth stage 908, to generate further customized fonts and original font states. This illustrates a process that a digital artist could use to develop a font with desired visual characteristics. Further, higher levels of interpolation and extrapolation are also considered, for instance generating a transformation based on the paths and control points of a third vector object, fourth vector object, etc. Accordingly, the techniques described herein provide a platform for the development of an infinite combination of novel font states.

Example System and Device

Figure 12:
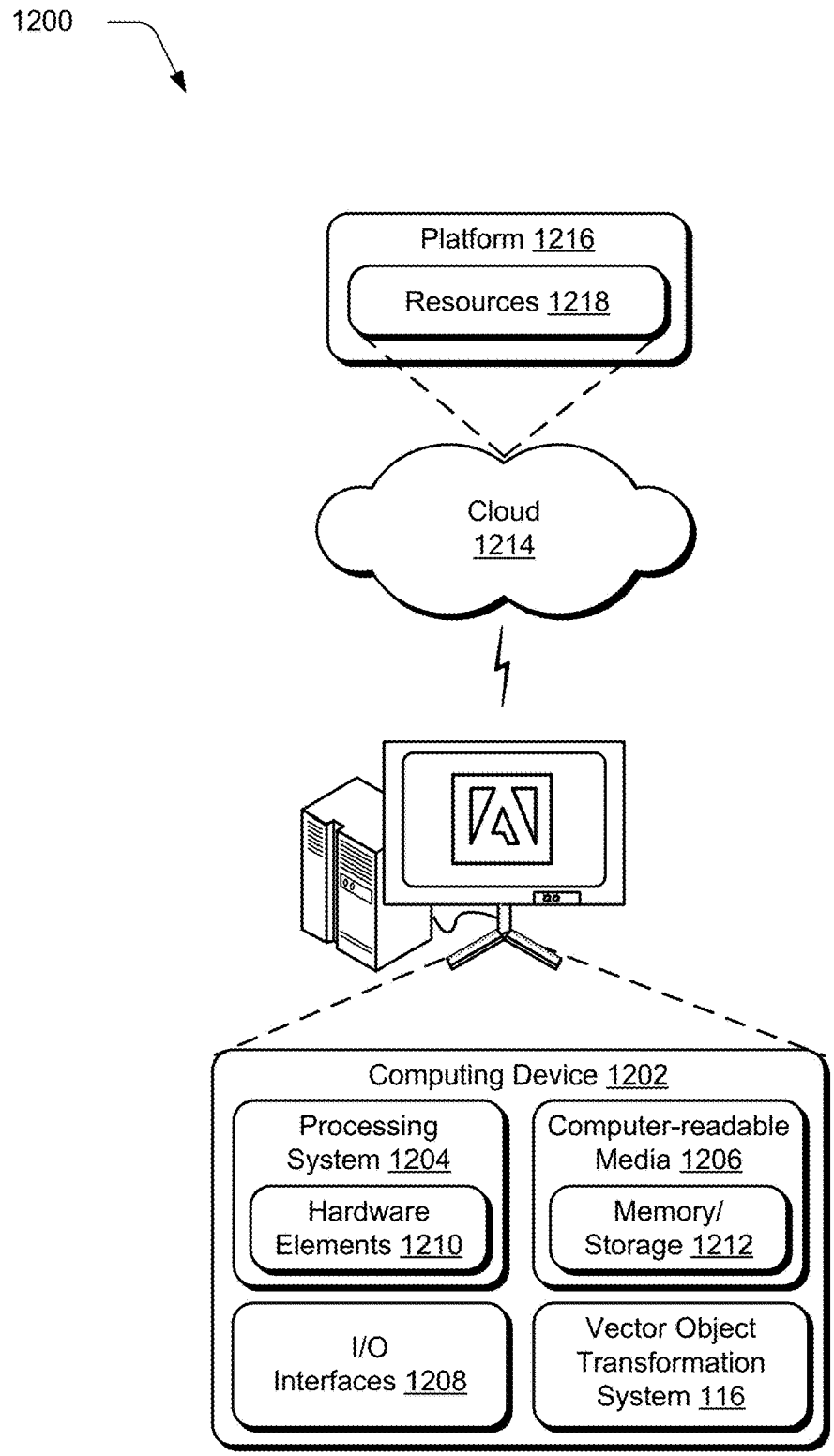
FIG. 12 illustrates an example system including various components of an example device that can be implemented as any type of computing device as described and/or utilize with reference to FIGS. 1-11 to implement embodiments of the techniques described herein.

FIG. 12 illustrates an example system generally at 1200 that includes an example computing device 1202 that is representative of one or more computing systems and/or devices that implement the various techniques described herein. This is illustrated through inclusion of the vector object transformation system 116. The computing device 1202 is configurable, for example, as a server of a service provider, a device associated with a client (e.g., a client device), an on-chip system, and/or any other suitable computing device or computing system.

The example computing device 1202 as illustrated includes a processing system 1204, one or more computer-readable media 1206, and one or more I/O interface 1208 that are communicatively coupled, one to another. Although not shown, the computing device 1202 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware element 1210 that is configurable as processors, functional blocks, and so forth. This includes implementation in hardware as an application specific integrated circuit or other logic device formed using one or more semiconductors. The hardware elements 1210 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1206 is illustrated as including memory/storage 1212. The memory/storage 1212 represents memory/storage capacity associated with one or more computer-readable media. The memory/storage 1212 includes volatile media (such as random access memory (RAM)) and/or nonvolatile media (such as read only memory (ROM), Flash memory, optical disks, magnetic disks, and so forth). The memory/storage 1212 includes fixed media (e.g., RAM, ROM, a fixed hard drive, and so on) as well as removable media (e.g., Flash memory, a removable hard drive, an optical disc, and so forth). The computer-readable media 1206 is configurable in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1202. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1202, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1210. The computing device 1202 is configured to implement particular instructions and/or functions corresponding to the software and/or hardware modules. Accordingly, implementation of a module that is executable by the computing device 1202 as software is achieved at least partially in hardware, e.g., through use of computer-readable storage media and/or hardware elements 1210 of the processing system 1204. The instructions and/or functions are executable/operable by one or more articles of manufacture (for example, one or more computing devices 1202 and/or processing systems 1204) to implement techniques, modules, and examples described herein.

The techniques described herein are supported by various configurations of the computing device 1202 and are not limited to the specific examples of the techniques described herein. This functionality is also implementable all or in part through use of a distributed system, such as over a "cloud" 1214 via a platform 1216 as described below.

The cloud 1214 includes and/or is representative of a platform 1216 for resources 1218. The platform 1216 abstracts underlying functionality of hardware (e.g., servers) and software resources of the cloud 1214. The resources 1218 include applications and/or data that can be utilized while computer processing is executed on servers that are remote from the computing device 1202. Resources 1218 can also include services provided over the Internet and/or through a subscriber network, such as a cellular or Wi-Fi network.

The platform 1216 abstracts resources and functions to connect the computing device 1202 with other computing devices. The platform 1216 also serves to abstract scaling of resources to provide a corresponding level of scale to encountered demand for the resources 1218 that are implemented via the platform 1216. Accordingly, in an interconnected device embodiment, implementation of functionality described herein is distributable throughout the system 1200. For example, the functionality is implementable in part on the computing device 1202 as well as via the platform 1216 that abstracts the functionality of the cloud 1214.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:
1. A method comprising:
generating, by a processing device, a plurality of paths from a first vector object and a plurality of paths from a second vector object;
determining, by the processing device, corresponding paths by detecting which of the plurality of paths from the first vector object correspond to which of the plurality of paths from the second vector object;
generating, by the processing device, a mapping of control points of the corresponding paths to each other, the generating the mapping of control points includes balancing unmapped control points using one or more proportional insertions;
generating, by the processing device, a transformation of the first vector object by adjusting at least one control point of said control points of the first vector object based on corresponding control points of the second vector object based on the mapping; and
rendering, by the processing device, the transformation of the first vector object for display in a user interface by a display device.
2. The method as described in claim 1, wherein the generating the transformation includes receiving a user input specifying a relative amount of influence of the second vector object on the first vector object and adjusting the at least one control point of the first vector object based on the relative amount.

3. The method as described in claim 1, wherein the control points include anchor points and handles associated with the anchor points.

4. The method as described in claim 3, wherein the generating the transformation includes linearly interpolating properties associated with the anchor points and the handles, the properties including locations, roundedness, and smoothness.

5. The method as described in claim 1, wherein the generating the mapping of control points is performed using dynamic time warping (DTW).

6. The method as described in claim 5, wherein the generating the mapping of control points further includes computing additional matches of control points by extracting refined point matches indicative of control point matches by employing a cost graph and balancing remaining unmatched control points using the one or more proportional insertions.

7. The method as described in claim 1, wherein the generating the plurality of paths includes receiving the first vector object and generating a recommendation for the second vector object based on characteristics of the first vector object.

8. The method as described in claim 1, wherein the first vector object is a glyph from a source vector font and the second vector object is a corresponding glyph from a target vector font.

9. The method as described in claim 1, wherein the generating the transformation of the first vector object is based in part on a plurality of paths and control points of a third vector object.

10. A system comprising:
a memory component; and
a processing device coupled to the memory component, the processing device to perform operations comprising:
receiving as input a first vector object and generate a recommendation for a second vector object based on characteristics of the first vector object;
generating a plurality of paths from the first vector object and a plurality of paths from the second vector object;
determining corresponding paths by detecting which of the plurality of paths from the first vector object correspond to which of the plurality of paths from the second vector object;
generating a mapping of control points of the corresponding paths to each other, the generating includes balancing unmapped control points using one or more proportional insertions; and
generating a transformation of the first vector object based on the mapping.

11. The system as described in claim 10, wherein the recommendation is generated based on a lowest cost analysis to generate the transformation of the first vector object.

12. The system as described in claim 10, wherein the recommendation is generated based on a scoring metric indicating a similarity of visual characteristics of the first vector object to the second vector object.

13. The system as described in claim 10, wherein the processing device is configured to receive a specified relative amount of influence of the second vector object on the first vector object and adjust at least one control point of said control points of the first vector object based on the specified relative amount.

14. The system as described in claim 10, wherein the first vector object is a glyph from a source vector font and the second vector object is a corresponding glyph from a target vector font.

15. The system as described in claim 10, wherein the mapping is generated by:
determining an initial match of control points using Dynamic Time Warping (DTW);
computing additional matches of control points by employing a cost graph to extract refined point matches indicative of control point matches; and
balancing remaining unmatched control points using the one or more proportional insertions.

16. A non-transitory computer-readable medium storing executable instructions, which when executed by a processing device, the processing device performs operations comprising:
generating a plurality of paths from a glyph of a source vector font and a plurality of paths from a corresponding glyph of a target vector font;
determining corresponding paths by detecting which of the plurality of paths from the glyph of the source vector font correspond to which of the plurality of paths from the glyph of the target vector font;
generating a mapping of control points of the corresponding paths to each other, the generating includes employing a cost graph to extract control point matches; and
generating a transformation of the glyph of the source vector font by adjusting at least one control point of said control points of the glyph of the source vector font based on corresponding control points of the glyph of the target vector font based on the mapping.

17. The non-transitory computer-readable medium as described in claim 16, further comprising rendering the transformation of the glyph of the source vector font for display in a user interface by a display device.

18. The non-transitory computer-readable medium as described in claim 16, wherein the generating the transformation includes receiving a specified relative amount of influence of the target vector font on the source vector font and adjusting the at least one control point of the glyph of the source vector font based on the specified relative amount.

19. The non-transitory computer-readable medium as described in claim 16, wherein the generating the transformation includes extrapolating properties associated with the at least one control point of the glyph of the source vector font away from properties associated with the corresponding control points of the glyph of the target vector font.

20. The non-transitory computer-readable medium as described in claim 16, wherein the generating the transformation includes extrapolating properties associated with the at least one control point of the glyph of the source vector font beyond the properties associated with the corresponding control points of the glyph of the target vector font.

* * * * *